Dec. 16, 1952 J. A. NEUBAUER ET AL 2,622,009
METHOD OF PURIFYING SODIUM HYDROXIDE SOLUTIONS
Filed Dec. 4, 1947 2 SHEETS—SHEET 2
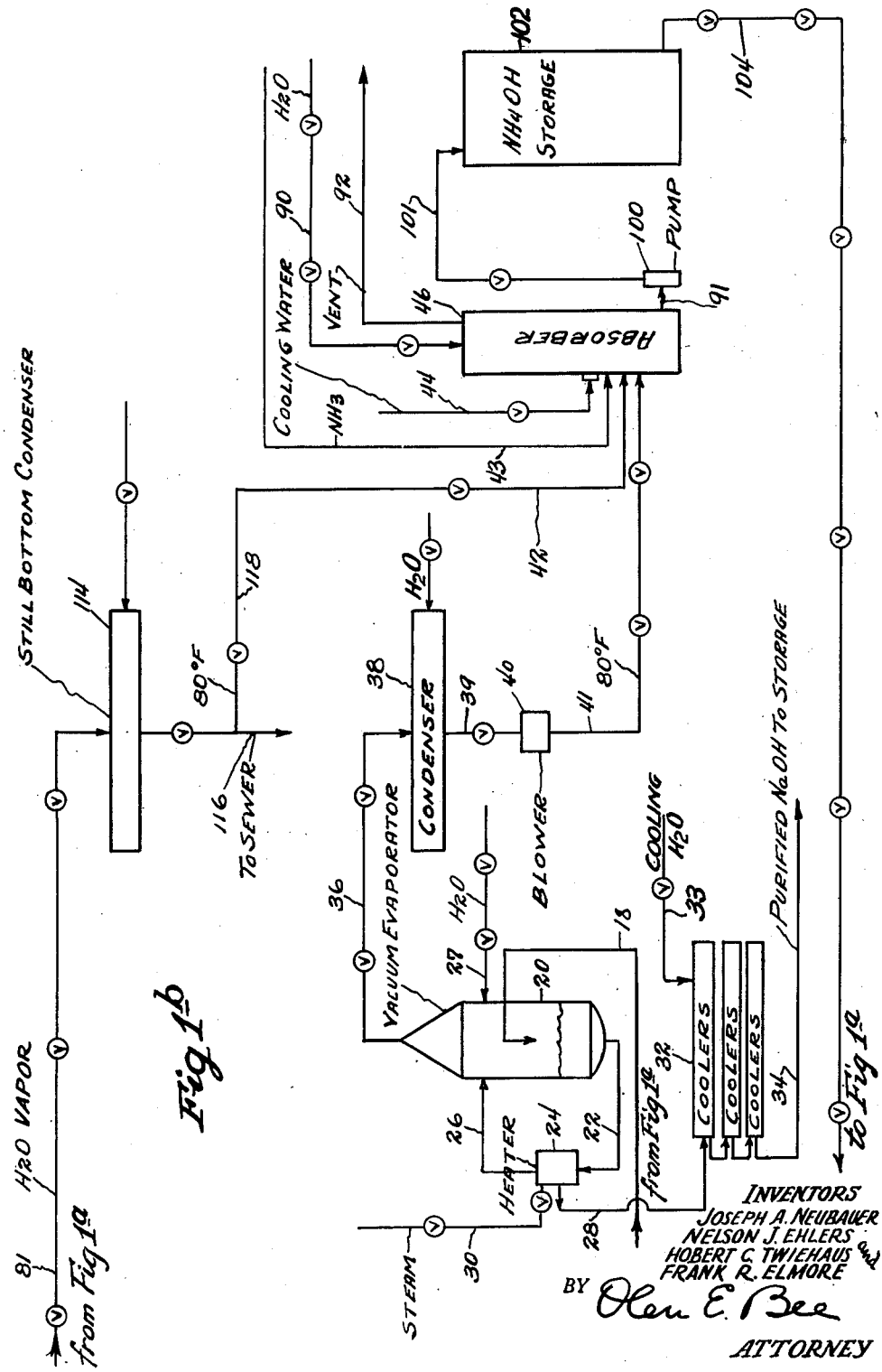
Fig. 1<sup>b</sup>
INVENTORS
JOSEPH A. NEUBAUER
NELSON J. EHLERS
HOBERT C. TWIEHAUS and
FRANK R. ELMORE
BY Olen E. Bee
ATTORNEY Patented Dec. 16, 1952

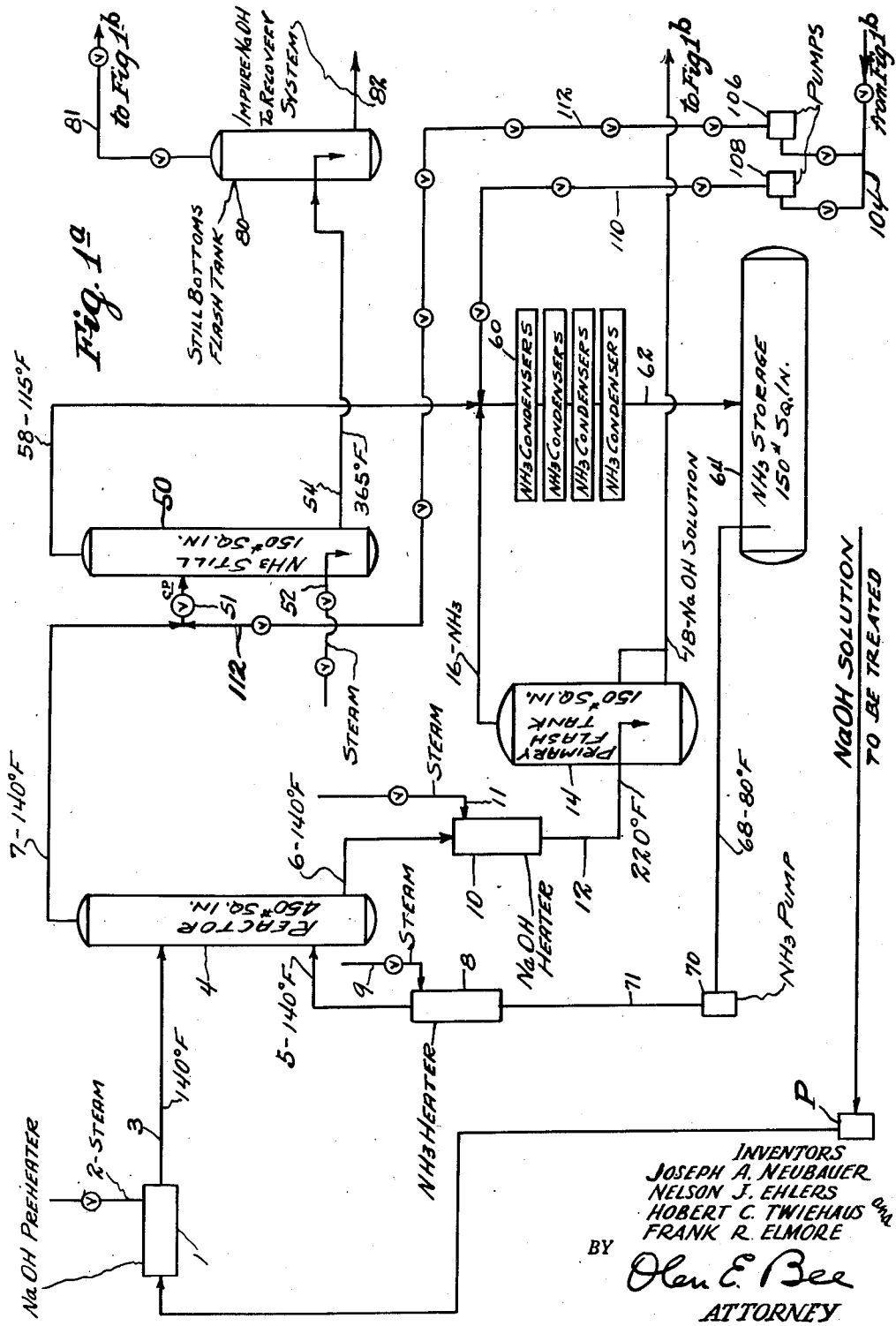

2,622,009

UNITED STATES PATENT OFFICE 2,622,009

METHOD OF PURIFYING SODIUM HYDROXIDE SOLUTIONS

Joseph A. Neubauer, Pittsburgh, Pa., Nelson J. Ehlers and Hobert C. Twiehaus, New Martinsville, W. Va., and Frank R. Elmore, Medina, Ohio, assignors, by mesne assignments, to Columbia-Southern Chemical Corporation, Pittsburgh, Pa., a corporation of Delaware Application December 4, 1947, Serial No. 789,700

8 Claims. (Cl. 23—184)

This invention relates to the purification of alkali metal hydroxides, and more particularly sodium hydroxide, by treatment with liquid ammonia to remove impurities incidental to their production.

The alkali metal hydroxide used most widely and produced in the largest amounts is sodium hydroxide, or caustic soda, for which reason the invention will be described with particular reference thereto by way of example but not of limitation. Caustic soda may be produced commercially in various ways, e. g., electrolysis of sodium chloride produces an aqueous solution containing, for example, about 8 to 12 percent by weight of sodium hydroxide. These solutions are contaminated by various impurities such, for example, as sodium sulfate, sodium chloride, sodium chlorates, iron and others, which must be removed to provide commercially acceptable products. At a concentration of about 45 to 50 percent caustic soda the solubility of many of these impurities is at a minimum, and because for many purposes concentrated or anhydrous caustic is desired, the common practice is to concentrate the impure caustic solution to the stated concentration whereby to throw out impurities which are then removed, as by settling and subsequent filtration. However, that practice leaves remaining in the aqueous caustic soda solution amounts of impurities, particularly sodium chloride and sodium chlorate, that are highly objectionable either because they cause corrosion of equipment with further introduction of impurities when the solution is concentrated further or converted to solid caustic, or because they render the product unsuited for various uses.

United States Patent Nos. 2,196,594 and 2,196,595, granted to I. E. Muskat, and owned by the assignee of the present application, disclose processes of producing highly purified alkali metal hydroxides, particularly caustic soda, from impure aqueous solutions, and especially solutions of these hydroxides produced by electrolysis. In accordance with those inventions alkali metal hydroxides of relatively high hydroxide content, e. g., produced by concentration of cell liquors, are intimately contacted with liquid ammonia, which removes certain impurities, particularly the alkali metal chlorides and chlorates. These solutions normally are saturated as to alkali metal chloride (NaCl) and contain several tenths of a percent of chlorate.

The term "liquid ammonia" as used in those patents and herein contemplates anhydrous liquid ammonia ($NH_3$) and mixtures of ammonia and water that contain at least enough ammonia (in general, at least about 65 percent) to insure the separation of a liquid phase consisting preponderantly of ammonia and water from a second liquid phase of which alkali metal hydroxide is the preponderant solute when the liquid ammonia and aqueous caustic phases are brought together.

The inventions of those patents as well as the inventions herein described are applicable to the purification of alkali metal hydroxide solutions without substantially altering the hydroxide concentration as well as to purification coupled with concentration. A typical procedure in accordance with those patented inventions involves countercurrent extraction of aqueous caustic soda with liquid ammonia, as by introducing the aqueous caustic soda into the upper portion of a column through which it moves downwardly countercurrent to upwardly flowing liquid ammonia introduced into a bottom portion of the column. With the aqueous caustic soda at a high concentration, for example 45 to 50 percent, and liquid ammonia of appropriate $NH_3$ content two liquid phases will be formed in the column, i. e., an upper, lighter phase containing the preponderance of the ammonia together with impurities extracted from the caustic soda solution, plus a minor proportion of caustic soda likewise extracted from the aqueous caustic fed to the column, and a lower, heavier phase containing the preponderance of the caustic soda in purified form.

Where the liquid ammonia fed to the column is substantially anhydrous or has a proportion of water less than that in equilibrium with the aqueous hydroxide under treatment, the aqueous hydroxide will be both purified and concentrated. Where, however, the liquid ammonia contains ammonia and water in such proportions that upon contact with the aqueous caustic soda the relative proportions of caustic and water in the lowerw phase do not alter appreciably, the concentration of the caustic will be substantially unchanged. The distribution ratio between the liquid ammonia and the aqueous caustic is such that in either case only a minor portion or substantially none of the sodium chloride and sodium chlorate remains in the caustic phase, which picks up only a minor portion of ammonia, while the ammonia phase takes up the said impurities and only a minor portion of the caustic soda.

In the practice of such a process the two liquids are, of course, fed to the column under superatmospheric pressure, and they are also heated substantially above atmospheric temperature usually about 50 to 100° C. The two phases are withdrawn separately from the column for subsequent treatment. Pressure upon the liquid ammonia phase withdrawn from the column is released and the liquid is heated to drive off ammonia gas which is condensed to reform liquid ammonia for treatment of further amounts of aqueous caustic. The withdrawn caustic phase contains a minor proportion of ammonia from the extraction step, and after withdrawal is heated to drive off ammonia, which suitably is combined with that driven from the ammonia phase. The caustic phase is then subjected to vacuum distillation to strip it of residual ammonia. This leaves the caustic soda solution in commercially pure condition, as described in the foregoing patents.

Extended experience with those patented processes has shown that while they are satisfactorily operative for their intended purposes operating difficulties at certain stages may be encountered. Experience has shown also that the processes are susceptible of economic improvement.

The primary object of this invention is to provide improvements in various details of liquid-liquid countercurrent purification processes of the type just described, particularly cyclic processes, which improvements are simple, effective, and reduce operating difficulties or afford advantages in economy, and which are useful and desirable individually in such processes as well as substantially bettering operation when practiced jointly.

Further objects will be recognized from the following specification.

In the drawings Figs. 1a and 1b are, respectively, the left and right sections of a flow sheet illustrative of the details of this invention as applied to the complete preferred embodiment.

We have discovered, according to this invention, that in the extraction step of the foregoing processes it is important to control the level, or height, of the dineric interface between the alkali metal hydroxide and ammonia phases to lie between the points of entry of the liquid ammonia and the aqueous alkali metal hydroxide into the column and above the ammonia inlet a distance not less than about 60 percent nor more than 90 percent of the distance between the ammonia and the caustic inlet. If the interface is maintained above the range specified purification is found to be poor. On the other hand if the interface is maintained below this level range, an excessive amount of ammonia per pound of caustic is required. Through such control of the interface height we obtain not only maximum removal of impurities with minimum $NH_3$ requirement but also the most effective purification at any given $NH_3$ : $NaOH$ ratio. For example, in one column, 40 feet in height, an ammonia inlet was provided 5 feet above the bottom thereof and a caustic inlet 9 feet below the top thereof. When the column was operated so that the interface was at a height of 13.5 feet above the ammonia inlet in the column the treated caustic soda contained 0.23 percent of sodium chloride on the anhydrous basis whereas at the same $NH_3$ : $NaOH$ ratio the NaCl content was but 0.03 percent when the interface was maintained between 16.5 and 21 feet above the ammonia inlet of the column. These tests were performed treating a solution containing 50% by weight NaOH, 1% by weight NaCl and about 0.4% by weight chlorate.

The economy of the process is improved by maintaining the contents of the column at substantially constant temperature throughout. In this way convection currents in the column are reduced to a minimum so that to produce alkali metal hydroxide of a given salt content substantially less ammonia is required per unit of alkali metal hydroxide. A uniform temperature of 130–160° F. is found to be preferable.

Experience has shown that the pressure reducing valve through which the withdrawn liquid ammonia phase passes may tend to become plugged through deposition of solids therein. Plugging of this pressure regulator may be minimized by introducing water, most suitably in the form of aqueous ammonium hydroxide derived from a later stage of the process, as will appear hereinafter, into the liquid ammonia prior to its passage to the pressure regulator. The aqueous ammonium hydroxide is, of course, introduced at the prevailing pressure in the system.

It may happen also that unintentionally the ammonia vapor recovered from the liquid ammonia phase may carry solids, resulting from the extraction step, into the liquid ammonia condenser, which is, of course, objectionable. We have found, and invention is further predicated upon this, that such difficulty can be avoided by introducing aqueous ammonium hydroxide into the ammonia vapor passing to the condensers. Not only does this avoid the necessity for make-up of the system due to the cause just mentioned, but also the amount of water requisite in the liquid ammonia for a given extraction may thus be supplied and at the same time the liquid ammonia storage pressure reduced.

A further feature of our invention resides in initially distilling or flashing off a portion of the ammonia in the withdrawn caustic phase at the same pressure at which ammonia is evaporated from the withdrawn ammonia phase, whereby the ammonia from these two sources may be combined without the necessity for using a pump in adding the ammonia from the caustic phase to that from the ammonia phase, or the necessity for separate condensers is avoided, thus further improving the overall economy of the process.

Another feature involves a convenient method of providing a proper balance of the amount of water in the caustic extraction without use of an undue number of pumps or other equipment. In order to obtain maximum purity with a minimum of $NH_3$, it is found advantageous to extract aqueous alkali metal hydroxide with $NH_3$- water mixtures containing at least 5% water, usually 5 to 20 percent by weight of water. After the pressure upon the caustic phase has been reduced to a lower superatmospheric and a portion of the ammonia has been flashed off as previously described, the remaining caustic is heated to drive off the ammonia in gaseous state. This ammonia is recovered by scrubbing with a controlled amount of water so as to form an aqueous solution of ammonium hydroxide having a concentration of about 10 to 25 percent $NH_3$ by weight. Sufficient of this solution is added to the ammonia flashed off under pressure from the ammonia phase to cause the ammonia to become liquid at a pressure of 100 to 200 pounds per square inch at a temperature below 100° F. Furthermore the amount of ammonium hydroxide solution added is sufficient to furnish sufficient water to adjust the ammonia-water ratio to that which is introduced into the reactor. Thus a convenient means is provided for introducing water in the ammonia and simplifying condensing and ammonia storage.

As indicated above, any of these several features may be incorporated individually with advantage in the procedures of the foregoing patents but for maximum efficiency and economy we prefer to make use of all of them.

The invention may be described further with reference to the accompanying drawings which represent the preferred embodiment of th invention. Caustic soda solution containing, for example, about 45 to 60 percent by weight of caustic soda and produced by concentration of cell liquor is drawn from a source, not shown, and forced by a positive pressure pump P (Fig. 1a) under superatmospheric pressure through a preheater 1 that is supplied with steam through a line 2, and thence through a line 3 into the upper portion of a column reactor 4. Liquid ammonia is withdrawn from a storage tank 64 by a positive pressure pump 70 which passes it under superatmospheric pressure in a line 71 to a heater 8 supplied with steam through a line 9. From the heater 8 the liquid ammonia passes through a line 5 into the bottom portion of reactor 4. The liquid ammonia is brought by the pump 70 and the heater 8 to the same pressure and temperature as the caustic soda. This pressure is above 300 pounds per square inch, usually about 400-500 p. s. i. The exact pressure required is determined by the autogenous pressure established in the reactor.

The ammonia rises in the column through the heavier and downwardly moving caustic soda and in so doing extracts impurities such as sodium chloride and chlorate. Two liquid phases form in the reactor, as described above, and the rates of feed of the two liquids and of withdrawal of the two phases formed are regulated so as to maintain the interface between the phases between the points of entry of the two liquids and at least 60 percent but not substantially higher than 90 percent of the distance between the ammonia and caustic inlets, measured from the ammonia inlet.

An important feature of the invention, as indicated above, resides in maintaining the liquids within the column at substantially constant temperature throughout the column. For the purposes of this invention the benefits of so doing are obtained if there is not more than about 10° F. temperature variation throughout the column. This may be accomplished by controlling the temperatures of the two liquids fed to the column to be substantially the same, and by appropriate lagging of the column to that end.

Considering the ammonia phase first, it is drawn through a line 7 which passes it to a still 50 through a pressure regulating valve 51. Prior to entering the regulator 51 the liquid is comingled with aqueous ammonium hydroxide supplied through a line 112 from a source presently to be described. The still is appropriately heated as by live steam supplied through a line 52, to distill off ammonia gas with the still operated at an elevated pressure preferably not less than 75 p. s. i. and usually about 150 p. s. i. The gas passes through a line 58 to condensers 60 from which the liquid ammonia flows through a line 62 into the pressure storage vessel 64 which is maintained at the pressure under which still 50 is operated.

The still bottoms containing the impurities and caustic soda extracted from the aqueous caustic are withdrawn from still 50 through a line 54 and passed to a flash tank 80 for separation of any residual ammonia. After treatment in this tank the liquid, containing caustic soda and the extracted impurities, such as sodium chloride and sodium chlorate, is withdrawn through a line 82 for desired disposal by operations, which do not enter into the present invention.

Returning now the reactor, the caustic phase is withdrawn through a line 6 and passed to a heater 10 supplied with steam through a line 11. The heated caustic soda then passes through a line 12 into a flash tank 14 in which the pressure is reduced to that at which the ammonia still 50 is operated, thus causing evolution of the major portion of the ammonia carried by the custic liquor. In accordance with one feature of this invention, the ammonia evolved is taken off through a line 16 and combined with that in line 58, and because still 50 and flash tank 14 are operated at the same pressure, it is possible to do this without additional pumps and to use a single condenser. From flash tank 14 the caustic soda solution passes through a line 18 to a vacuum evaporator comprising a flash chamber 20 (Fig. 1b) and an outside heating element 24 that is heated by steam in a line 30. Residual ammonia in the custic entering through line 18 is flashed off in chamber 20, which is maintained under vacuum. The caustic solution passes from chamber 20 through line 22 to the heater 24 which serves the dual functions of stripping the solution of any residual ammonia and also of concentrating it somewhat, say 2 to 3 percent. The hot caustic solution leaves the heater through a line 28 which carries it to coolers 32 supplied with cooling water through a line 33. The cooled caustic then enters a line 34 which passes it to storage or for further treatment, such as concentration, which is not involved in the present invention. Water may be supplied to the evaporator through a line 27, if desired, so that the cooled and purified caustic withdrawn through line 34 has a desired concentration.

The mixture of ammonia and water vapor passes from the evaporator through a line 36 to a water cooled condenser 38 which may partially condense the ammonia-water vapor mixture, then through a line 39 to a blower 40 connected by a line 41 to an absorber 46 that receives water through a pipe 90. The product of the absorber is aqueous ammonium hydroxide; it is drawn through a pipe 91 by a pump 100 that passes it through a line 101 to an ammonium hydroxide storage container 102. Any unabsorbed ammonia escapes to the atmosphere through a vent line 92. The absorber is cooled by water supplied through a line 44. In addition to the ammonia received from the evaporator 20, there is also passed to the absorber ammonia collected from such sources as safety valves, system leaks, and the like, which is collected and passed to the absorber through a pipe 43. Also, the vapor from the still bottom flash tank 80 is passed through a line 81 to a condenser 114, and if the condensate contains any ammonia it is passed through a pipe 118 to the absorber 46, otherwise it goes to the sewer through line 116.

The ammonium hydroxide that is combined with the liquid ammonia phase withdrawn from reactor 4, as described above, is supplied from the storage tank 102 through a pipe 104 which passes it to a pump 106 that forces it through line 112 under the pressure in line 7, into the liquid ammonia flowing to regulator 51. Similarly, the ammonium hydroxide that is supplied to the ammonia gas fed to condensers 60 derives from the same source and passes to the condensers through a line 110 after being raised by pump 108 to the pressure of the condenser system.

Although the operating details, such as temperatures, pressures, concentrations, and the like may be varied according to the nature of the reactor feed and the character of the final caustic product, in the treatment of a concentrated caustic cell liquor to produce purified liquor of approximately the same concentration of caustic soda, satisfactory results are to be had by operating under the following conditions. Caustic liquor containing about 50 percent of NaOH, by weight, is introduced to reactor 4 at about 140° F. and about 450 p. s. i. pressure. The liquid ammonia is fed at the same temperature and pressure and may contain from 70 to 95 percent of $NH_3$. The pressure on the withdrawn liquid ammonia phase is reduced by regulator 51 to about 150 p. s. i. and the still 50, condensers 60 and storage container 64 are maintained at the same pressure. Still 50 is heated by steam to a liquid temperature of about 365° F. The withdrawn caustic phase is brought by heater 8 to a temperature of about 220° F., and in accordance with the invention the pressure upon it in the flash tank 14 is the same as that in still 50, namely, 150 p. s. i. Pump 106 raises the pressure of the aqueous ammonium hydroxide in line 112 to 450 p. s. i., and the aqueous ammonium hydroxide in line 110 is raised by pump 108 to 150 p. s. i. Evaporator 20 is suitably operated at about 20 to 21 inches of mercury pressure, while absorber 46 is operated at atmospheric pressure. The effluent from condensers 38 and 114 is suitably at about 80° F. The purified caustic liquor leaves heater 24 at about 250° F., and it is at about 75° F. when it leaves coolers 32. Operating under these conditions the following results are typical:

|  | Feed | Product |
|---|---|---|
| NaOH | 50.4% anhydrous basis | 50.1%. |
| NaCl | 2.12% anhydrous basis | 0.14% anhydrous basis. |
| $NaClO_3$ | 0.41% anhydrous basis | 0.0006% anhydrous basis. |
| $Na_2CO_3$ | 0.30% anhydrous basis | 0.30% anhydrous basis. |
| $NH_3$ | | 0.0002% anhydrous basis. |

Makeup $NH_3$ may be introduced into the system by introducing 88% $NH_3$ to the 150 p. s. i. $NH_3$ storage or 19% $NH_3$ to the $NH_4OH$ storage.

The following lists the operating conditions of a typical run at which the operation illustrated in the drawings was conducted at a rate such as to purify 150 tons per day of impure NaOH. The rates of feed given are in terms of pounds per hour. The pressures were those specified in the drawing which values are expressed in pounds gauge per square inch.

Diameter of column _____ feet __ 3.0
Height of reactor column _____ do ____ 40
Height of $NH_3$ inlet (from bottom of reactor) _____ feet __ 5
Height of NaOH inlet (from bottom of reactor) _____ feet __ 31
Height of $NH_3$ outlet (from bottom of reactor) _____ feet __ 40
Height of interphase from $NH_3$ inlet at bottom of column _____ feet __ 16.5 to 21

NaOH fed through inlet analysis:
   13,084 lb. NaOH
     262 lb. NaCl
      52 lb. $NaClO_3$
   12,152 lb. $H_2O$ $NH_3$ fed through inlet 5 analysis:
   $NH_3$— 5370 lb.
   $H_2O$— 800 lb. } (about 88% $NH_3$)

NaOH phase withdrawn through outlet 6 analysis:
   12,500 lb. NaOH
      19 lb. NaCl
       0 lb. $NaClO_3$
    2,500 lb. NH
   10,680 lb. $H_2O$ $NH_3$ flashed at 150 lb. per square inch
   through line 16 _____ lb __ 2,060
Temperature of flash _____ °F __ 220

$NH_3$ phase withdrawn through outlet 7 analysis:
    583 lb. NaOH
    243 lb. NaCl
     52 lb. $NaClO_3$
  2,274 lb. $H_2O$
  2,870 lb. $NH_3$ $NH_3$ flashed through line 58 to condenser _____ lb __ 3,110

NaOH from primary flash tank analysis:
   12,500 lb. NaOH
      19 lb. NaCl
       0 lb. $NaClO_3$
     440 lb. $NH_3$
   10,680 lb. $H_2O$ $NH_3$ distilled from evaporator analysis:
   $NH_3$ _____ lb __ 440
   $H_2O$ _____ lb __ 1,560
Water added in scrubber _____ lb __ 302

$NH_4OH$ analysis recovered from scrubber and sent to storage:
   $NH_3$— 422 lb.
   $H_2O$—1860 lb. } (about 19% $NH_3$)

$NH_4OH$ from storage to condenser (through line 110) analysis:
   800 lb. $H_2O$
   182 lb. $NH_3$ $NH_4OH$ from storage to still (through line 112) analysis:
   $NH_3$ _____ lb __ 240
   $H_2O$ _____ lb __ 1,060

It will be understood that departures from these conditions are permissible within the scope of this invention. For example equivalent operation within the scope of this invention is possible if the NaOH solution treated ranges from 45 to 60 percent NaOH by weight concentration, the ammonia-water mixture sent to $NH_3$ storage and introduced through inlet 3 contains 80 to 95% $NH_3$ by weight, the pressure in the reactor is above 300 for example 400–500 p. s. i. and in still 50 ranges from 100 to 200 pounds per square inch, the temperature in the reactor ranges from 120 to 175° F., the amount of water introduced into the scrubber 46 produces ammonium hydroxide containing 10–25% $NH_3$ by weight, and the $NH_3$ in the reactor is sufficient to form a pair of liquid phases.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. A method of purifying aqueous sodium hydroxide containing 45 to 60 percent NaOH by weight and sodium chloride as an impurity which comprises extracting, at a temperature of 140° F. and a pressure above 400 pounds per square inch, a quantity of said hydroxide with aqueous ammonia containing 88% NH₃ in amount sufficient to form a liquid phase which is primarily ammonia and water together with sodium chloride extracted from the sodium hydroxide solution, and a second liquid phase comprising purified NaOH water and ammonia, separating the phases, reducing the pressure upon said first phase to 150 pounds per square inch and heating to distill the ammonia therefrom at said reduced pressure, reducing the pressure upon said second phase to 150 pounds per square inch and flashing ammonia therefrom, releasing the pressure upon the remaining sodium hydroxide in said second phase and heating to drive off residual ammonia together with some water vapor, scrubbing the resulting ammonia-water vapor mixture with a controlled amount of water to recover the ammonia as an aqueous solution containing 19 percent by weight of NH₃, combining the evolved ammonia from the first phase and the ammonia released at 150 lb. per square inch pressure from the second phase with sufficient of said ammonium hydroxide solution to produce aqueous ammonia containing 88% by weight NH₃, at a pressure of 150 pounds per square inch, condensing the resulting mixture and recycling said mixture to purify a further amount of sodium hydroxide solution, and mixing the remaining ammonium hydroxide with the first phase prior to reduction of the pressure therefrom to 150 pounds per square inch.

2. A continuous method of purifying aqueous alkali metal hydroxide which comprises continuously introducing aqueous alkali metal hydroxide to be purified adjacent the top of a column, continuously introducing adjacent the bottom of said column aqueous liquid ammonia containing sufficient NH₃ to cause the formation in the column of a liquid phase containing the major proportion of the ammonia and a second liquid phase containing the major proportion of the alkali metal hydroxide in purified form, maintaining the contents of the column under superatmospheric pressure above 200 pounds per square inch, continuously withdrawing said phases separately from the column while maintaining their dineric interface between the points of entry of said liquid ammonia and aqueous alkali metal hydroxide and not lower than 60 percent nor higher than 90 percent of the distance between the ammonia and alkali metal hydroxide inlets in the column, reducing the pressure on the separated ammonia phase to a lower superatmospheric pressure above 75 pounds per square inch and distilling it to separate ammonia therefrom under said reduced pressure, heating the separated alkali metal hydroxide phase and reducing the pressure on it to that at which the ammonia phase is distilled and thereby releasing ammonia carried by the alkali metal hydroxide phase at said reduced pressure combining the ammonia thus recovered from said phases, vacuum distilling the separated alkali metal hydroxide phase to drive off a mixture of water vapor and residual ammonia gas and leave purified aqueous alkali metal hydroxide, condensing said mixture and forming aqueous ammonium hydroxide, passing a portion of said aqueous ammonium hydroxide to the separated ammonia phase prior to reduction of pressure therefrom and under its prevailing pressure, passing to the recovered ammonia a further portion of said aqueous ammonium hydroxide sufficient to provide the resulting mixture with the concentration of water in said aqueous ammonia and cycling the thus-produced aqueous liquid ammonia to said column.

3. A method of purifying aqueous alkali metal hydroxide containing at least 45% alkali metal hydroxide and alkali metal chloride as an impurity which comprises extracting said hydroxide with liquid ammonia under a pressure of at least 200 pounds per square inch whereby to cause separation of a pair of liquid phases, one of which contains a major portion of liquid ammonia and the other of which contains purified aqueous alkali metal hydroxide, separating the phases, distilling the ammonia phase at a pressure not less than 75 pounds per square inch to separate ammonia therefrom, decreasing the pressure on the alkali metal hydroxide phase to the pressure of the distilled ammonia whereby to release ammonia from the alkali metal hydroxide phase combining and condensing the ammonia released from both of said phases and recycling the condensed liquid ammonia to extract further alkali metal hydroxide.

4. In a method of purifying aqueous alkali metal hydroxide by liquid-liquid countercurrent extraction thereof with liquid ammonia in which liquid ammonia is introduced at superatmospheric temperature and pressure into the lower portion of a column and rises therethrough to form a liquid phase containing the major proportion of the ammonia, and the aqueous alkali metal hydroxide to be purified is introduced at superatmospheric temperature and pressure into an upper portion of the column and flows downwardly therethrough to form a separate liquid phase containing the major proportion of the alkali metal hydroxide in purified form, the said phases are separately withdrawn from the column, the withdrawn liquid ammonia phase is heated and the pressure on it reduced to drive off ammonia, the ammonia released is condensed to form liquid ammonia, and the withdrawn purified alkali metal hydroxide phase is treated to drive off ammonia and recover purified ammonia free aqueous alkali metal hydroxide, the improvement comprising the steps of reducing the pressure upon the ammonia phase to a lower superatmospheric pressure and distilling off ammonia from the ammonia phase, heating the withdrawn alkali metal hydroxide phase, reducing the pressure on it to that at which the withdrawn liquid ammonia phase is distilled, to flash ammonia from the aqueous alkali metal hydroxide, combining the thus released ammonia with that recovered from the ammonia phase, distilling the aqueous alkali metal hydroxide phase to drive off a mixture of residual ammonia and water vapor, condensing said mixture to form aqueous ammonium hydroxide, and passing a portion of said aqueous ammonium hydroxide to the withdrawn liquid ammonia phase prior to reducing the pressure on said liquid ammonia phase.

5. A method according to claim 4 in which another portion of the aqueous ammonium hydroxide is passed to the combined ammonia distilled from said withdrawn liquid ammonia and purified aqueous alkali metal hydroxide phases and condensing the mixture to form liquid ammonia of ammonia and water contents adapted for said liquid-liquid extraction.

6. In a method of purifying aqueous alkali metal hydroxide by liquid-liquid countercurrent extraction thereof with liquid ammonia in which liquid ammonia is introduced at superatmospheric temperature and pressure into the lower portion of a column and rises therethrough to form a liquid phase containing the major proportion of the ammonia, and the aqueous alkali metal hydroxide to be purified is introduced at superatmospheric temperature and pressure into an upper portion of the column and flows downwardly therethrough to form a separate liquid phase containing the major proportion of the alkali metal hydroxide in purified form, the said phases are separately withdrawn from the column, the withdrawn liquid ammonia phase is heated and the pressure on it reduced to drive off ammonia, the ammonia released is condensed to form liquid ammonia, and the withdrawn purified alkali metal hydroxide phase is treated to drive off ammonia and recover purified ammonia free aqueous alkali metal hydroxide, the improvement comprising the steps of reducing the pressure upon the withdrawn ammonia phase to a lower superatmospheric pressure, distilling off ammonia from the ammonia phase, reducing the pressure on the withdrawn alkali metal hydroxide phase to that at which the liquid ammonia phase is distilled, and heating said alkali metal hydroxide phase to flash ammonia from the aqueous alkali metal hydroxide, combining the thus released ammonia with that recovered from the ammonia phase, distilling the aqueous alkali metal hydroxide phase to drive off a mixture of residual ammonia and water vapor, condensing said mixture to form aqueous ammonium hydroxide, and passing a portion of the aqueous ammonium hydroxide to the combined ammonia distilled from said withdrawn liquid ammonia and purified aqueous alkali metal hydroxide phases and condensing the mixture to form liquid ammonia of ammonia and water contents adapted for said liquid-liquid extraction.

7. A method of purifying aqueous alkali metal hydroxide which comprises contacting, at a pressure above 200 pounds per square inch, liquid aqueous alkali metal hydroxide containing at least 45 percent by weight of said hydroxide with liquid aqueous ammonia, the amount of ammonia present being at least sufficient to cause formation of a liquid phase containing a major portion of the ammonia from a second liquid phase containing a substantial portion of said hydroxide separating the liquid phases, reducing the pressure upon the ammonia phase to a superatmospheric pressure not less than about 75 pounds per square inch, distilling the ammonia phase at said reduced pressure to separate ammonia therefrom, heating the alkali metal hydroxide phase and decreasing the pressure to the pressure of the distilled ammonia to permit flashing of ammonia therefrom and to leave aqueous alkali metal hydroxide, distilling said aqueous hydroxide to remove a vapor mixture of ammonia and water vapor therefrom, contacting said vapor mixture with water whereby to remove ammonia from the mixture and form an aqueous solution of ammonium hydroxide, adding a portion of the ammonium hydroxide solution to the ammonia phase before reducing the pressure thereupon, adding another portion of the ammonium hydroxide to the ammonia separated from the alkali metal hydroxide and ammonia phases under said superatmospheric pressure and proportioning the amounts of ammonium hydroxide added to the distilled ammonia and to the ammonia phase to ensure the presence of sufficient water in the gaseous ammonia-ammonium hydroxide mixture to permit condensation of the gaseous ammonia so separated at substantially the distillation pressure.

8. A method of removing an impurity of the group consisting of chloride and chlorate from an aqueous solution of sodium hydroxide which contains said impurity and 45 to 60 per cent by weight of NaOH, which method comprises introducing the sodium hydroxide solution into an upper portion of a column, introducing a member of the group consisting of anhydrous liquid ammonia and liquid mixtures of ammonia and water containing at least 80 per cent by weight of $NH_3$ into a lower portion of the column, countercurrently extracting the sodium hydroxide solution as said solution descends through the column in contact with the ammonia flowing upwardly through the column whereby to cause separation of a liquid caustic phase and a liquid ammonia phase, maintaining the pressure above 200 pounds per square inch and the temperature at 120 to 175° F. within the column, collecting the caustic phase at the bottom of the column whereby to form a liquid layer of the caustic phase and a second liquid layer of ammonia phase resting upon the first named layer, and regulating the rate of withdrawal of said caustic phase and said ammonia phase so that the level of the interface between the two layers is maintained at a distance above the point of ammonia introduction into the column not less than about 60 per cent nor more than about 90 per cent of the distance between the points of introduction of ammonia and aqueous sodium hydroxide into the column; the weight ratio of $NH_3$ introduced into the column to NaOH introduced into the column being in the substantial proportion of 5370 to 13,084.

JOSEPH A. NEUBAUER.
NELSON J. EHLERS.
HOBERT C. TWIEHAUS.
FRANK R. ELMORE.

REFERENCES CITED

The following references are of record in the file of this patent:

UNITED STATES PATENTS

| Number | Name | Date |
| --- | --- | --- |
| 1,961,590 | MacMullin | June 5, 1934 |
| 2,196,594 | Muskat | Apr. 9, 1940 |
| 2,196,595 | Muskat | Apr. 9, 1940 |
| 2,361,780 | Lewis | Oct. 31, 1944 |